US005095532A

United States Patent [19]

Mardus

[11] Patent Number: 5,095,532

[45] Date of Patent: * Mar. 10, 1992

[54] METHOD AND APPARATUS FOR ROUTE-SELECTIVE REPRODUCTION OF BROADCAST TRAFFIC ANNOUNCEMENTS

[75] Inventor: Claus Mardus, Bad Salzdetfurth, Fed. Rep. of Germany

[73] Assignee: Robert Bosch GmbH, Stuttgart, Fed. Rep. of Germany

[ * ] Notice: The portion of the term of this patent subsequent to May 28, 2008 has been disclaimed.

[21] Appl. No.: 459,144

[22] Filed: Dec. 29, 1989

[51] Int. Cl.[5] .......... G08G 1/09; H04B 1/06

[52] U.S. Cl. .......... 455/186; 340/905; 455/228; 455/345

[58] Field of Search .......... 455/67, 186, 226, 228, 455/345; 371/37.1; 364/436, 443, 444, 449; 340/905, 994, 995, 988, 990

[56] References Cited

U.S. PATENT DOCUMENTS

| | | | |
|---|---|---|---|
| 3,949,401 | 4/1976 | Hegeler et al. | 343/200 |
| 4,380,821 | 4/1983 | Eckhardt et al. | 455/33 |
| 4,435,843 | 3/1984 | Eilers et al. | 455/205 |
| 4,450,589 | 5/1986 | Eilers et al. | 455/205 |
| 4,499,603 | 2/1985 | Eilers | 455/205 |
| 4,570,227 | 2/1986 | Tachi et al. | 364/444 |
| 4,737,916 | 4/1989 | Ogawa et al. | 340/995 |
| 4,796,189 | 1/1989 | Nakayama et al. | 364/444 |
| 4,862,513 | 8/1989 | Bragas | 455/45 |
| 4,888,699 | 12/1989 | Knoll et al. | 364/449 |
| 4,890,104 | 12/1989 | Takanabe et al. | 340/995 |
| 4,907,159 | 3/1990 | Mauge et al. | 364/436 |

FOREIGN PATENT DOCUMENTS

| | | |
|---|---|---|
| 3536820 | 4/1987 | Fed. Rep. of Germany . |
| 3633881 | 4/1988 | Fed. Rep. of Germany . |
| 2554618 | 5/1985 | France . |
| 2050767 | 1/1981 | United Kingdom . |

OTHER PUBLICATIONS

Map of Area Between Hildesheim (Blaupunkt HQ) & Hamburg, West Germany.

Boretz, "TravelPilot System Set for End-of-Year Debut", Automotive Electronics Journal, Jan. 29, 1990, p. 19.

*Primary Examiner*—Reinhard J. Eisenzopf

*Assistant Examiner*—Chi H. Pham

*Attorney, Agent, or Firm*—Frishauf, Holtz, Goodman & Woodward

[57] ABSTRACT

In a method for route-selective reproduction of digitally encoded traffic annoucements broadcast by a transmitter to a vehicle receiver, the announcements being decoded in a decoder of the receiver, a comparison of route-specific characteristics with characteristics of the trip route is performed. If the characteristics agree to a predetermined extent, the driver is provided with the traffic announcement applicable to him, via a visual and/or acoustical output device. In a feature of this method, the road types and their numerical designations are used as the route-specific characteristics. In a further feature of this provision, major route segments and shorter route segments may also serve as route-specific characteristics. By means of a trip segment transducer, the distance already covered can also be ascertained, so that only traffic announcements pertaining to obstructions in regions of the route that are still to be covered are transmitted. By additionally evaluating the driving speed, traffic announcements pertaining to very distant obstructions that can be expected to have been eliminated by the time that segment is reached can also be suppressed. The advantage of these provisions is that the driver is not distracted by a great number of traffic advisories that are not relevant for him.

18 Claims, 2 Drawing Sheets

| | | | | | | | | | |
|---|---|---|---|---|---|---|---|---|---|
| A | x | E1 | DIRECTION | E2 | BETWEEN | M1 | (AND) | M2 | (STANDARD TEXT) |

METHOD AND APPARATUS FOR ROUTE-SELECTIVE REPRODUCTION OF BROADCAST TRAFFIC ANNOUNCEMENTS

Cross-Reference to related U.S. Patents and applications of Robert Bosch GmbH and its subsidiary Blaupunkt Werke GmbH, the disclosures of which are hereby incorporated by reference: U.S. Pat. No. 3,949,401, HEGELER et al., issued Apr. 6, 1976, entitled FREQUENCY IDENTIFICATION CIRCUIT FOR BROADCAST TRAFFIC INFORMATION RECEPTION SYSTEMS;

U.S. Pat. No. 4,435,843, EILERS & BRAGAS, issued Mar. 1984;

U.S. Pat. No. 4,450,589, EILERS & BRAGAS, issued May 1984;

U.S. Pat. No. 4,499,603, EILERS, issued Feb. 1985;

U.S. Pat. No. 4,862,513, BRAGAS, issued Aug. 29, 1989, entitled RADIO RECEIVER WITH TWO DIFFERENT TRAFFIC INFORMATION DECODERS; U.S. Ser. No. 307,349, LUBER et al., filed Feb. 7, 1989, entitled POWER CONSERVING SYSTEM FOR RADIO ALERT RECEIVERS, now abandoned in favor of continuation application Ser. No. 622,385, filed Nov. 30, 1990; German Patent Disclosure DE-OS 39 03 468, LUBER et al., filed Feb 6, 1989, to which U.S. Ser. No. 469,180 filed Jan. 24, 1990, corresponds; German Patent Disclosure DE-OS 39 04 344, TEMPELHOF, filed Feb. 14, 1989, to which U.S. Ser. No. 468,703, filed Jan. 23, 1990, corresponds;

U.S. Ser. No. 447,578, DUCKECK, filed Dec. 7, 1989, COMPUTATION-CONSERVING TRAFFIC DATA TRANSMISSION METHOD & APPARATUS; U.S. Ser. No. 447,165, BRAGAS & DUCKECK, filed Dec. 7, 1989, DIGITAL TRAFFIC NEWS EVALUATION METHOD; U.S. Ser. No. 447,378, DUCKECK, filed Dec 7, 1989, ENERGY-CONSERVING STAND-BY FUNCTION IN RADIO TRAFFIC REPORT RECEIVER;

U.S. Ser. No. 459,147, DUCKECK & BRAGAS, filed Dec. 29, 1989, now U.S. Pat. No. 5,020,143 based on German pending application P 38 10 177.7;

U.S. Ser. No. 459,145, MARDUS, filed Dec 29, 1989, based on German pending application P 38 10 178.5;

U.S. Ser. No. 459,141, MARDUS, DUCKECK & BRAGAS, filed Dec. 29. 1989, based on German pending application P 38 10 179.3;

U.S. Ser. No. 458,882, DUCKECK & BRAGAS, filed Dec. 29, 1989, based on German pending application P 38 10 180.7:

U.S. Pat. No. 4,888,699, KNOLL et al., issued Dec. 19, 1989 and its continuation-in-part, U.S. Ser. No. 452,677, KNOLL et al., filed Dec. 18, 1989;

CROSS-REFERENCE TO RELATED LITERATURE

European Broadcasting Union Technical Standard 3244-E, entitled SPECIFICATIONS OF THE RADIO DATA SYSTEM RDS FOR VHF/FM SOUND BROADCASTING (EBU Technical Centre, Brussels, Mar. '84, 60 pp.);

German Patent disclosure DE-OS 38 06 842, KNOLL, published Sept. 14, 1989.

BACKGROUND OF THE INVENTION

The invention relates to a method for route-selective reproduction of digitally encoded traffic announcements broadcast by a transmitter to a vehicular radio receiver, according to U.S. Pat. No. 4,862,513, BRAGAS.

An article by Peter Bragas entitled "Leit- und Informationssysteme im Kraftfahrzeug—ein Beitrag zur Verbesserung des Verkehrsablaufs und der Verkehrssicherheit" [Guidance and Information Systems in the Motor Vehicle—A Contribution to Improving Traffic Flow and Traffic Safety] in the Journal "Internationales Verkehrswesen" [International Traffic Management], No. 5/85, discloses a method for route-selective reproduction of digitally encoded traffic announcements in which with the input of the desired route, only announcements pertaining to that route are output. The method makes use of the so-called transparent channel of the RDS data telegram, on which digitally encoded traffic announcements can be broadcast.

The advantage of the known provision is that the announcements pertaining to the driver reach him purposefully, and his attention is not distracted by announcements that are irrelevant to him. Particularly at peak traffic times, this reduces stress on the driver and thus improves traffic safety.

It has also, been proposed, in a radio receiver for receiving and decoding digitally encoded traffic announcements, to provide a memory that is divided into highway-oriented segments, which are subdivided in turn into shorter route segments. The data stored in these segments can be called up by evaluating the digital traffic announcements. In this way the detailed information corresponding to the data telegram can be generated, and the digital data transmission can take place at a faster repetition rate.

THE INVENTION

It is the object of the invention to embody the known method described above in such a way that based on the encoded broadcast traffic announcements and the desired route, the selection of the relevant traffic announcements and their delivery to the driver can be done reliably and quickly.

The provisions according to the invention are based on the thought that a uniform terminology is important for successful comparison of route-specific characteristics of the traffic announcements with characteristics of the route. The comparison can then be performed automatically by logical principles. A unique terminology, in other words one without any ambiguities, is suitable for this. This is true for the official designations of the most important roads in the Federal Republic of Germany, which are designated by type as Autobahns (limited-access highways), Bundesstrassen (federal highways), Landesstrassen (state highways) or Kreisstrassen (county roads). The Autobahns are designated by the letter A and the major highways are designated by the letter B. To distinguish among roads of the same type, the letters are followed by numbers, which may be in one, two or three places.

By using these terms in the route-specific characteristics of the traffic announcements and of the route, a comparison can be done quickly even if there is a very large number of characteristics. It is particularly advantageous that when the road type differs, the check can be ended as soon as the characteristic letters for that road type arise; in other words the ensuing numerical term does not need to be checked. This aspect will play a role in the future for automatically detected traffic obstructions, because compared with the present situation, in which traffic obstructions are detected rather coincidentally, the scope of the traffic announcements then will increase considerably.

In a further feature of the invention, routing names, route segments and the direction of travel can also be used as route-specific characteristics for the comparison, in a systematically hierarchically arranged succession. Examples of routing names are large cities that define a major route segment, such as A7 Kassel-Hannover or A7 Hannover-Hamburg; cities, four-way or three-way interchanges or exits are for instance suitable as nodes to define shorter route segments, such as A7 Hannover-Hamburg between Westenholz and the three-way Autobahn interchange at Walsrode or A7 Hannover-Hamburg between Soltau-Ost and Bispingen. The direction of travel is defined by the order of the routing names.

One provision particularly convenient in combination with the aforementioned features is to ascertain the distance to be covered and optionally the driving speed and then to report to the driver only traffic advisories on obstructions located on portions of the route still to be covered and that the driver can be expected to encounter before the obstructions are resolved. In this way, traffic announcements about obstructions will not cause the driver to make a detour when the obstructions will have already been taken care of by the time he reaches the portion of his route where they occurred.

The invention also relates to a vehicular receiver having a decoder for decoding digitally encoded traffic announcements that are received.

In this respect, the object is to provide a vehicular receiver that based on the broadcast encoded traffic announcements and the desired route is capable of selecting the relevant traffic announcements reliably and quickly and supplying them to the driver.

With the embodiment according to the invention, the characteristics of the route to be taken, which are stored in the memory unit, are compared, directly after the reception of new traffic announcements, with the route-specific characteristics of these announcements, and if agreement is found, they are passed to the output unit and delivered to the driver either visually or acoustically or both. Thus the driver does not have to memorize the kinds of roads and their numbering, and this is particularly valuable for roads not very familiar to him, and then compare them with the incoming traffic announcements. Instead, he can define the route before he begins his trip, either using a card or in dialogue, for instance in the so-called scanning mode, with a suitably embodied vehicular receiver.

In using a terminology that is equivalent to or approximate to the official designations of the most important roads, that is, A for Autobahn and B for federal highways or major highways, followed by a number differing from the roads of the same road type, the comparison can be performed quickly, because of the relatively small quantity of data for each characteristic. Thus the driver receives the traffic announcements applicable to him without significant delay.

If other characteristics besides the road types and numerical designations are taken into account, such as routing names or route segments, then a hierarchical division of the memory into primary, intermediate and subordinate zones proves to be particularly suitable, because in this case if the characteristics already deviate in a higher hierarchical stage the check can be terminated without having to take the other hierarchical stages into account. This is particularly advantageous for the sake of fast comparison when extensive traffic announcements are made.

To make a restriction to traffic announcements pertaining only to the route that is still to be covered, a trip segment transducer with an evaluation circuit ascertains the local segments of the trip that have already been covered and erases the characteristics relating to this part of the route. The trip segment transducer and the evaluation circuit may also be embodied such that the expected time until arrival at the route segment having the traffic obstruction is calculated and is compared in a comparator with a predetermined period of time. Only if the time is less than or equal to this time is an enable signal supplied to the enable input of the gate circuit.

Further features of the invention and advantageous embodiments will become apparent from the claims, description and drawing, the drawing showing an exemplary embodiment of the invention.

DRAWINGS

DETAILED DESCRIPTION

Figures 1, 2:
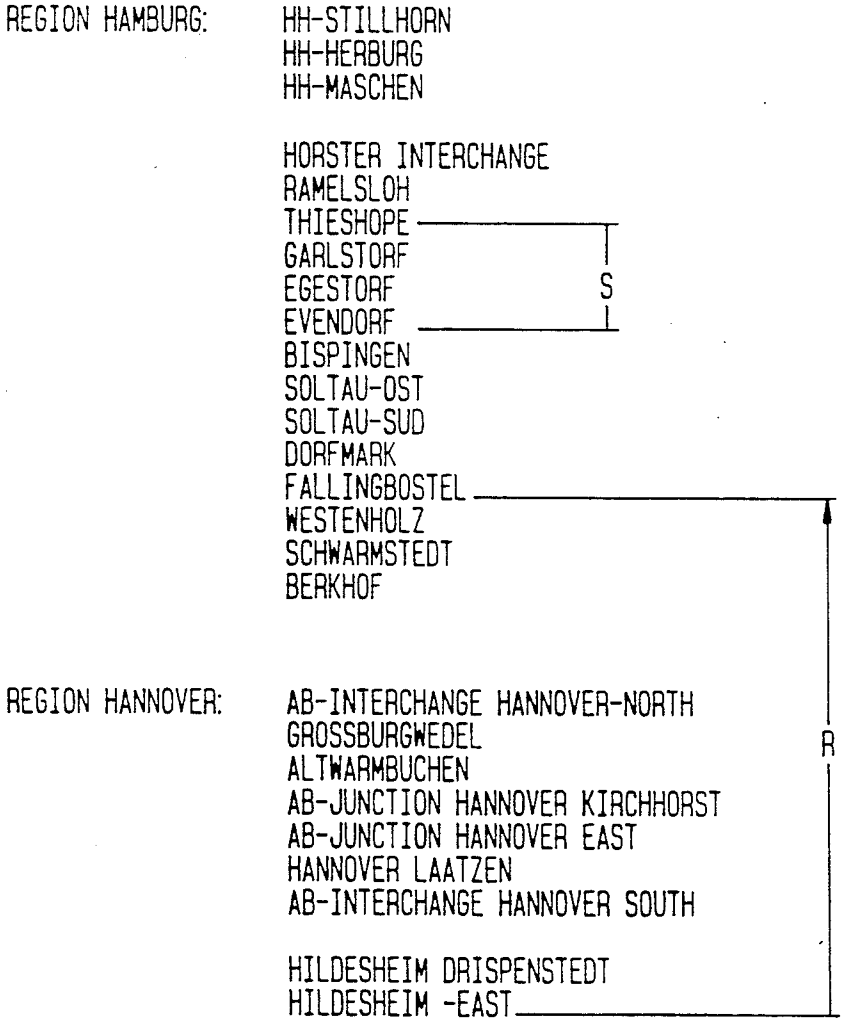
FIG. 1 shows the formatting principle for traffic announcements, along with an encoding for traffic announcements performed by this formatting principle.
FIG. 2 shows one possibility of classifying roads by route-specific characteristics.

FIG. 1 is an example showing the formatting principle for traffic announcements. The information included in the traffic announcements can be divided into specific structures. In traffic announcements that pertain to an obstruction on any road, the abbreviations used in FIG. 1 are used. The first item is A or B and refers to the road type, namely Autobahn or superregional highways. This is followed by a numerical term x or y standing for the number following the road type.

To define major route segments, routing names are used, identified by the letter E and a number. To define shorter route segments, the letter M with a number is used. Finally, various standard texts are also provided, which likewise use letters or numbers for their designation, but for which the route selection to be performed according to the invention does not play any role.

For broadcasting encoded traffic announcements, it is attractive to perform the encoding based on this formatting principle. It is then possible to input the same route-specific characteristics in specifying the route of the trip, and to make a comparison among these characteristics. Since the order of the characteristics is hierarchically graduated, it is practical to have the comparison begin at the characteristics located on the left and then proceed successively from left to right. As soon as a characteristic is different, the comparison can be ended. This is particularly practical with an extensive number of traffic announcements, so that from among these traffic announcements a relevant traffic advisory can be identified as fast as possible.

To explain the method, reference is made to FIG. 2, in which the routing names and the nodes, in the present case exits and four-way or three-way interchanges between Hamburg-Stillhorn and Hildesheim-Ost are listed taking the example of the Autobahn A7.

The trip is intended to take the route R on A7 from Hildesheim Ost toward Hamburg as far as Fallingbostel. When the trip begins, the route to be taken is first input. This can be menu-driven in the scanning mode, to make it easier to use even for drivers not yet familiar with the method or the system. The magistrals, or in other words the major route segments, can be input, or the origin and destination can be input as well. In the latter case, a processor will then automatically seek a suitable magistral from a stored number of magistrals or calculate them and display them as an acknowledgement, or if multiple possibilities exist may require a selection to be made and only then will it issue an acknowledgement.

During the trip, the characteristics of the route are compared with the route-specific characteristics of the received, digitally-encoded traffic announcements, in the order explained in conjunction with FIG. 1. If the comparison is limited to the types of roads and to the routing names, then all the traffic announcements about obstructions on A7 between Hannover and Hamburg would be admitted, including the traffic announcements on an obstruction S between Evendorf and Garlstorf.

On the other hand, if the route segments between individual exits or interchanges are taken into account, then the traffic announcement about the obstruction S would be suppressed because the destination is before the segments where the obstruction S is located. This is also true if the vehicle covers this distance in the opposite direction, that is from Hamburg toward Hannover.

If the portion of the route covered and the average or instantaneous speed are additionally evaluated, then further improvements are attainable. If the origin is assumed to be Hildesheim-Ost once again, with the destination being Hamburg-Harburg, and if the vehicle were already in Rammelsloh when the traffic announcement about the obstruction S is broadcast, then the characteristics of the portion of the route already covered would not longer be considered up to date and the reproduction of the traffic announcements on this obstruction would not take place.

In a further modification, if it is assumed that the origin is located far away from the road segment including the obstruction S, for instance Kassel, and the destination is Hamburg-Harburg, then if traffic announcements about the obstruction are broadcast, the time required to reach Evendorf would also be ascertained. This travel time is then compared with a predetermined comparison time that is for instance equivalent to the typical cycle in which traffic announcements are repeated. With the assumed set of factors, the expected travel time is longer than the comparison time and the traffic announcements are suppressed.

Figure 3:
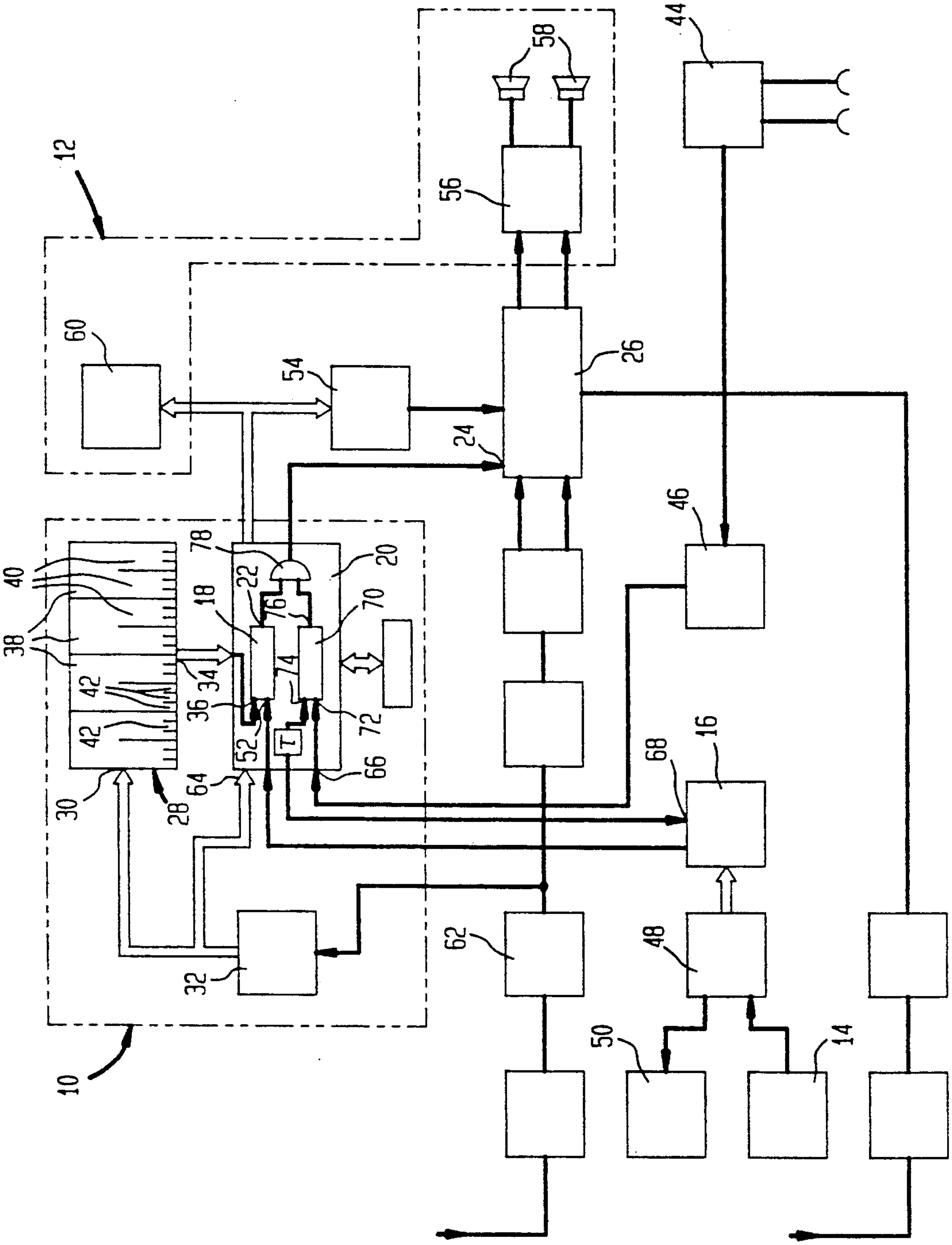
FIG. 3 is a block circuit diagram of a vehicular receiver according to the invention.

FIG. 3 shows a vehicular receiver that in addition to the usual components for receiving regular radio broadcasts includes a possible version of the characteristics according to the invention. These characteristics relate to a decoder 10 that includes a plurality of components: an output device 12, an input device 14, a memory device 16, a comparator 18 within a control circuit 20, and a gate circuit 26 the enable input 24 of which is connected to a parity output 22 of the comparator 18. Additionally, a trip segment transducer 44 and an evaluation circuit 46 for trip data may also be provided.

The characteristics of the route are input into the memory device 16 via the input device 14. For easier use, this is done in dialogue with a processor 48, which emits requests or acknowledgements via a display 50. The characteristics of the route stored in the memory device 16 are supplied to one input 52 of the comparator 18. When the traffic announcements arrive, another input 36 of the comparator 18 receives route-specific characteristics via one output 34 of a memory 28. If the characteristics of the inputs 36 and 52 agree, then the enable input 24 of the gate circuit 26 is triggered via the parity output 22. An announcement, made audible by a speech processor 54, is passed on by this gate circuit via a low-frequency amplifier 56 to loudspeakers 58, with the radio program in progress being interrupted or reduced in volume. A display 60 may optionally also be provided and triggered, for visual reproduction of the traffic announcements.

The generation of the route-specific characteristics appearing at the output 34 of the memory 28 is done by means of data stored hierarchically in the memory 28, from which data the characteristics are obtained, by triggering suitable memory locations via address inputs 30, by means of an RDS evaluation circuit 32. To this end, the RDS evaluation circuit 32 is supplied with the signal at the output of an FM-IF (Intermediate Frequency) stage 62 of the receiver and evaluates the RDS signal of the auxiliary carrier broadcast along with the normal radio program. To limit the memory space requirement, the memory 28 is divided in hierarchical order, specifically into primary zones 38, intermediate zones 40 and subordinate zones 42. The roads of the same road type and the same numerical name are combined in the primary zones 38. The routing names are combined in the intermediate zones 40, one or more of which is assigned to each of the primary zones 38. The subordinate zones 42 include the nodes, or in other words exits, place names, and three- or four- way interchanges. They are stored in alphabetical or route-specific order. The direction of travel is then apparent from the ascending or descending order of the characteristics.

In addition to the route-specific characteristics, the characteristics of the standard texts can also be stored in the memory 28. If that is not the case, then the entire announcement can also be made by decoding and conversion of the data telegrams, evaluated by the RDS evaluation circuits 32, in the control circuit 20. To this end, a signal line also leads from the RDS evaluation circuit 32 to one input 64 of the control circuit 20.

To take into account the portion of the trip already traveled, the trip segment transducer 44 (wheel sensor or tachometer pulse preparation) is also used, along with the evaluation circuit 46. The output signals of the evaluation circuit 46 reach one input 66 of the control circuit 20, which ascertains the characteristics of the trip portion covered, and erases the characteristics that are no longer up to date by transferring control signals to one input 68 of the memory device 16. This can be done particularly simply if the memory device 16 operates in the manner of a shift register and is clocked in synchronism with the trip segment covered.

An additional function is attained by means of a further comparator 70, one input 72 of which receives the output signals of the evaluation circuit 46 and the other input 74 of which receives a time comparison signal with a predeterminable time tau. If the calculated time is less than or equal to the predetermined time, then via a less-than/equal-to output 76 of the comparator 70, an enable signal is supplied to the enable input 24 of the gate circuit 26. To enable linking the output signals of the two comparators 70 and 18, an AND element 78 is also disposed, between the outputs 22 and 76, on the one hand, and the enable input 24, on the other.

The comparators 18 and 70 shown in the control circuit 20 need not be present in physical form. In a practical embodiment, it is more suitable to provide a computer, which performs the described functions by program control. In this process the functions of other component groups can also be included. The RDS evaluation circuit 32, the processor 48, the speech processor 54 and the evaluation circuit 46 are suitable for this purpose. For the sake of greater simplicity, however, there was no attempt made to show these components in the control circuit 20 in the drawing.

Various changes and modifications may be made within the scope of the inventive concept.

I claim:

1. In a traffic information system including a transmitter and at least one vehicle-mounted receiver equipped with a digital data decoder (10) and a memory (16), a method for route-selective reproduction of digitally encoded traffic announcements broadcast by said transmitter, comprising the steps of storing in said memory (16) data characteristic of a route of travel intended by a vehicle driver, including storing a travel direction and at least one of a point of origin and a specific initial road designation;

decoding traffic announcements forming part of a signal received from said transmitter and identifying specific route designations contained in each announcement;

comparing said specific route designations with said stored intended route;

and selectively communicating to said driver, by at least one of an audio indication and a visual indication, any announcement which contains a route designation which matches, to a predetermined extent, said stored intended route.

2. The method of claim 1, wherein said step of storing said intended route comprises storing at least one of the following characteristics:

a road type;

route number;

interchange designation;

limited-access exit number;

distance marker point; and city code.

3. The method of claim 2, wherein said identifying step comprises placing said decoded announcements in temporary storage and sorting said announcements according to the same characteristic(s) as those used for storing said intended route.

4. The method of claim 1, wherein said storing step comprises storing each characteristic as a code consisting of a road type character and a road number having not more than 3 digits or places.

5. In a traffic information system including a transmitter and at least one vehicle-mounted receiver equipped with a digital data decoder (10) and a memory (16), a method for route-selective reproduction of digitally encoded traffic announcements broadcast by said transmitter, comprising the steps of storing in said memory (16) data characteristic of a route of travel intended by a vehicle driver including storing a point of origin and a point of destination and automatically selecting, according to predetermined criteria, a route connecting said points from a database of available route segments;

decoding traffic announcements forming part of a signal received from said transmitter and identifying specific route designations contained in each announcement;

comparing said specific route designations with said stored intended route;

and selectively communicating to said driver, by at least one of an audio indication and a visual indication, any announcement which contains a route designation which matches, to a predetermined extent, said stored intended route.

6. The method of claim 1, wherein said step of storing said intended route comprises storing a point of origin and a point of destination;

communicating to a vehicle operator a plurality of possible alternative routes, assembled from a database of available route segments, and storing a route selected by said vehicle operator.

7. The method of claim 5, further comprising comparing said origin and destination points with points previously stored in memory and, in the event of a match therebetween, providing an indication to a vehicle operator.

8. The method of claim 1, further comprising periodically determining what portion of said intended route has already been covered, and limiting said comparing step to portions of said intended route not yet covered.

9. The method of claim 8, further comprising identifying any portion of each traffic announcement indicating expected duration of a traffic condition at a particular location, calculating expected vehicle travel time to said location, and limiting said comparing step to announcements associated with locations on said intended route expected to be reached within a time "window" surrounding said expected duration.

10. A vehicular radio receiver having a tuner stage (62);

a decoder (10) connected to an output of said tuner stage, decoding digitally encoded received traffic announcements, a memory device (16) storing route-specific characteristics of a plurality of route segments;

an input device (14), connected to an input of said memory, for storing in said memory characteristics of a route of travel intended by a vehicle operator;

a control circuit (20), connected to respective outputs of said decoder (10) and of said memory (16), and including a comparator (18) comparing route-specific characteristics of the decoded traffic announcements with characteristics of the intended route of travel, and an output device (12) providing at least one of a visual and an acoustical indication of traffic announcements to said vehicle operator;

a gate circuit (26) between an output of the decoder (10) and an input of the output device (12), connected to an output of said control circuit (20) and applying a traffic announcement from said decoder to said output device only when said control circuit (20) has determined that route-specific characteristics of the announcement match route-specific characteristics of said intended route.

11. The vehicular radio receiver of claim 10, wherein memory locations of a memory (28) include route-specific characteristics of a region relevant to traffic announcements; address inputs (30) of the memory (28) are connected to an evaluation circuit (32) for the route-specific portions of the encoded traffic announcements;

and outputs (34) of the memory (28) are connected to inputs (36) of the comparator (18).

12. The vehicular radio receiver of claim 11, wherein the memory locations of the memory (18) are divided into zones, combined in which are zones or memory locations for subordinate quantities.

13. The vehicular radio receiver of claim 12, wherein the memory locations are subdivided into primary zones (38) for different road types and their numerical designations.

14. The vehicular radio receiver of claim 13, characterized in that the primary zones (38) are divided into intermediate zones (40) for major route segments.

15. The vehicular radio receiver of claim 14, characterized in that the intermediate zones (40) are divided into subordinate zones (42) for shorter route segments.

16. The vehicular radio receiver of claim 13, characterized in that the road types, numerical designations, or the major route segments or shorter route segments are uniformly classified in an ascending or descending order with respect to a travel direction.

17. The vehicular radio receiver of claim 11, wherein a trip segment transducer (44), and an evaluation circuit (46) connected to the output thereof, are provided, and are connected, via said control circuit (20), to the memory (28) for the input route-specific characteristics in such a way that those characteristics, associated with a trip segment already traversed, are erasable.

18. The vehicular radio receiver of claim 17, wherein a trip segment transducer (44) having an evaluation circuit (46) is provided, both for determining at least one of an average speed and an instantaneous speed and for calculating the time required to reach the route segment having a traffic obstruction, and a less-than/equal-to output of a means (70) for comparing time is connected, via a logic linking element (78), to the enable input (24) of the gate circuit (26).

* * * * *